May 8, 1956 D. W. SCHOEN 2,744,734
BEATER EJECTOR
Filed Sept. 11, 1953

INVENTOR
DONALD W. SCHOEN
BY William C. Babcock
ATTORNEY

United States Patent Office 2,744,734
Patented May 8, 1956

2,744,734

BEATER EJECTOR

Donald W. Schoen, St. Paul, Minn., assignor, by mesne assignments, to Illinois McGraw Electric Co., a corporation of Illinois Application September 11, 1953, Serial No. 379,697

12 Claims. (Cl. 259—1)

This invention relates to household food mixers and similar power units, and more particularly, to improved beater or shaft ejecting mechanism for such devices.

Various constructions have been proposed in the prior art for ejection of the beaters from the gear casing of a household food mixer in response to manipulation of some sort of operating member by the user. Some of the prior devices have either failed to provide the desired leverage or have involved the use of a large number of parts with consequent high cost of manufacture and assembly.

One object of the present invention is the provision of a simplified beater ejector mechanism for a household food mixer.

Another object is a beater ejecting mechanism involving a minimum number of parts which can be readily inserted and removed substantially as a unit during final assembly of the device.

Another object is the provision of a beater ejector in which the working parts are concealed and protected within the gear housing or motor casing of the mixer, but can be readily inserted or removed without exposure of the motor or driving connections of the power unit.

A further object is a beater ejecting mechanism located within a separate chamber or recess of the gear casing for insertion and removal of the ejecting mechanism without exposure or loss of lubricant from the driving mechanism inside the remainder of the casing.

Other objects and advantages of the invention will be apparent from the following specification in which a preferred form of beater ejector is described with particular reference to the accompanying drawings. In these drawings, wherein like reference characters indicate like parts, Figure 1 is a partial perspective view of the gear casing or motor housing of a household food mixer constructed and adapted to receive the beater ejecting mechanism according to the present invention.

Figure 1:
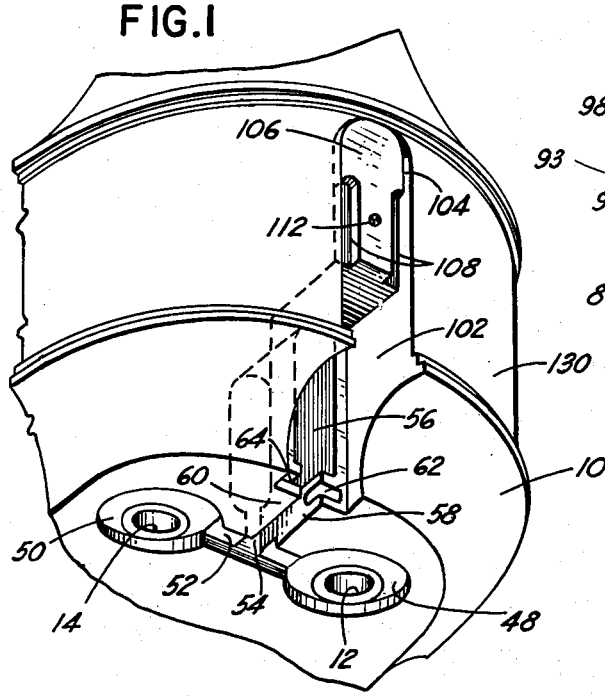

As indicated above, the present invention is adapted for use in a household food mixer which ordinarily includes a gear casing 10 defined by outer walls, such as the bottom, side and front walls shown. Casing 10 may either be in the form of a separate gear casing which is assembled at one end of a suitable motor unit (not shown) or the casing 10 may be an integral part of the motor or power unit.

In one standard type of food mixer, the casing 10 is provided with two vertical beater drive spindles 12 and 14. These spindles are rotatable on parallel vertical axes and are carried by suitable bearings within casing 10. The lower ends of beater drive spindles 12 and 14 are accessible at the bottom wall of the casing and are provided with axial recesses 16 and 18, respectively, to receive the upper ends of beater shafts 28 and 30. These beater shafts are designed to carry agitating elements 31 for operation within a suitable mixing bowl 33.

In order to couple the drive spindles 12 and 14 in driving engagement with beater shafts 28 and 30, the spindles are provided with cross shafts 20 and 22, respectively, which engage slots 24 and 26 in the upper ends of the beater shafts. To retain these shafts in their assembled position within the drive spindles and yet permit their ready removal for cleaning, retaining means are provided which are adapted for disengagement by forced relative axial movement of the shaft with respect to the spindle. In this example, the drive spindle 12 is provided with an annular recess 32 on its inner surface for engagement with an expandable snap ring 34 carried in a groove 36 on beater shaft 28. Similarly, drive spindle 14 has an annular recess 38 to accommodate the snap ring 40 carried by circumferential groove 42 of beater shaft 30.

Figure 5:
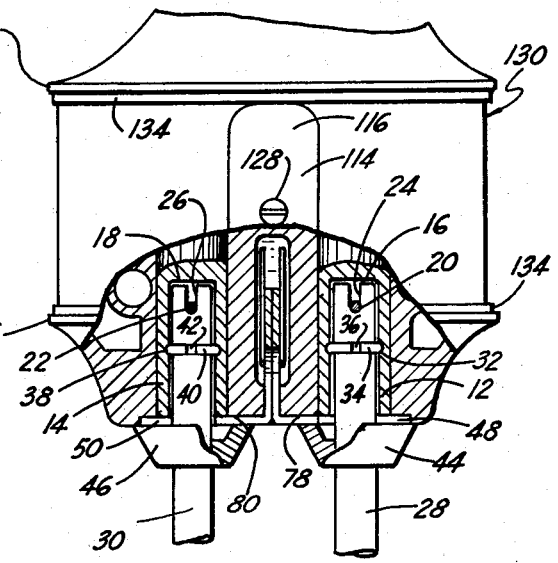
Figure 5 is a front view of the device of Figure 4 with certain portions removed and other portions broken away.

When the beater shafts are inserted to the position of Figure 5, the snap rings engage their respective recesses, as shown, to prevent inadvertent removal or disengagement of the shafts from the spindles. When removal of the shafts is desired, it is possible to disengage the parts by moving shafts 28 and 30 axially downwardly with sufficient force to compress temporarily the snap rings and permit the downward removal of the shafts.

In order to apply the desired downward ejecting force, the respective beater shafts are provided with ejecting collars 44 and 46, which have their upper edges located immediately adjacent and beneath the bottom of the gear casing 10. These ejecting collars also serve as batter guards to prevent movement of food particles up the beater shafts and into the drive spindles or bearings.

The bottom wall of the gear casing is provided with outwardly or downwardly facing recessed portions 48 and 50 adjacent each beater drive spidnle and within the area of the ejecting collars. These recessed areas 48 and 50 are designed to receive the ends of the ejecting fingers described below and are connected by a lateral recess 52, which is designed to accommodate the central or intermediate portion of the ejecting fingers. The shape of the recesses 48 and 50 may be varied to fit the shape of the ends of the fingers or for other purposes and may involve merely a straight extension at each end of recess 52. In any event, the portions 48, 50, and 52 may be considered as providing in effect a single or continuous downwardly opening recess in the bottom of the casing for accommodation of the ejecting fingers.

Communicating with the recess 48—50—52 is the passageway 54 at the lower end of a vertical chamber 56, which is open at its forward end as shown in Figure 1 through the adjacent front wall of the casing. The gear casing 10 extends inwardly to provide shoulders 58 and 60 at the bottom of chamber 56, and these shoulders project inwardly toward each other so that the lower portion of the passage at 54 is substantially narrower than the main portion 56. The inwardly projecting shoulders 58 and 60 are provided with lateral notches or recesses 62 and 64, which open toward the front of the casing and are designed to serve as bearings for the beater ejecting member.

This beater ejecting member is shown generally at 66 (Figure 2) and includes left and right ejector members 68 and 70, respectively, which are suitably secured together as by spot welding. The two halves of this ejector assembly carry projecting fulcrum or pivot members or bearing projections 72 and 74, which are designed for insertion in the supporting slots 62 and 64 by movement from the front toward the rear of the casing.

The ejecting member also includes an ejecting lever arm 76, designed to fit the narrow passageway 54 at the bottom of chamber 56. This ejecting lever arm extends from the fulcrum members 72 and 74 and carries the actual ejecting fingers or projections 78 and 80, projecting laterally from its lower end. These ejecting fingers 78 and 80 are designed to fit within the recess 52 in the bottom of the casing and to project into the recessed circular areas 48 and 50 above the respective ejecting collars 44 and 46 of the beater shafts. Thus the effective lateral cross section of the fingers is larger than that of passageway 54.

Because the passageway or slot 54 not only extends vertically from chamber 56 to the recess 52 in the bottom of the casing, but also extends forwardly and is open at the front of the casing to provide a single unobstructed slot through the intervening portions of both walls, assembly of the parts thus far described is greatly facilitated. The ejector member 66 can be inserted in the chamber 56 by movement from front to rear of the casing. During this movement, body portion 76 will slide rearwardly into slot or passageway 54, while ejecting fingers 78 and 80 move rearwardly below the bottom of the casing. As the ejector member moves rearwardly, the bearing projections 72 and 74 will move into bearing recesses 62 and 64. The ejector member can then be rocked on the newly established bearing so that ejector fingers 78 and 80 will move up into the recess 48—50—52.

Figure 4:
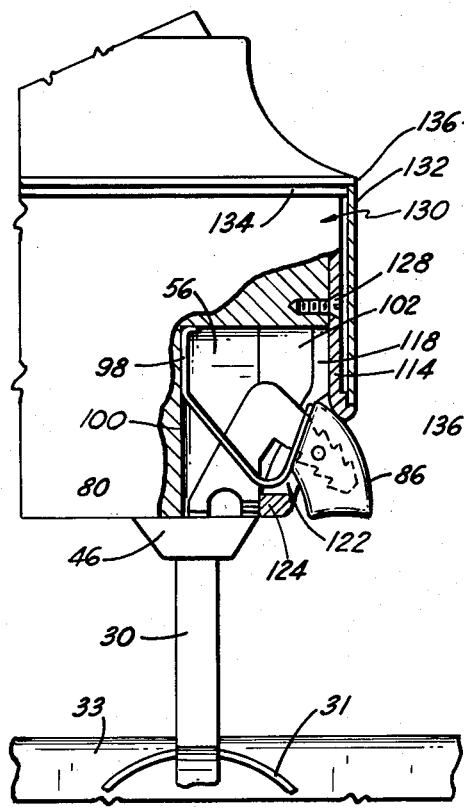
Figure 4 is a partial side elevation, with certain parts broken away and certain parts shown in section, to illustrate the beater ejector of the preceding figures in its fully assembled position.

Thus when the parts are in the assembled position of Figure 4, the ejecting fingers 78 and 80 will extend above the ejecting collars 44 and 46 substantially along the line joining the axes of the respective beater shafts. Downward movement of the ejecting fingers will then force the collars and shafts downwardly to eject the beaters. The downward ejecting movement of these fingers takes place as a result of rotation of the ejecting member around the pivot formed by bearing projections 72 and 74, which are rotatably received in the bearing recesses 62 and 64, as described above.

In order to provide for manual application of the force necessary to rotate the ejector assembly in the manner just described, the ejecting member includes an outwardly projecting operating arm 82. This arm is designed to extend forwardly out of chamber 56 beyond the front of the casing 10 to a point accessible to the operator. The outer end of the operating arm 82 carries an operating member or button 86. This button 86 is preferably made of plastic or insulating material and is held in place on arm 82 by any suitable securing means, such as the retaining teeth 84 on said arm. The button includes an outer face 88 against which force may be applied to rock the ejector assembly 66 around the pivot or fulcrum already described. The operating button 86 is also provided with outer and inner surfaces 90 and 92, respectively, which are preferably formed with radii of curvature which have a common center at the pivotal axis of the assembly defined by bearing projections 72 and 74. These curved surfaces will thus permit the operating button 86 to move smoothly in and out of a suitable opening in the front of the casing without the need for large and unsightly gaps around the button to provide the necessary clearance. While some or all of the ejector member parts thus far described might be formed as a single integral member, e. g., as a single aluminum casting, I prefer the construction as illustrated because of the economies that can be obtained by construction of the left and right ejector members from sheet stock which is easily stamped, bent and spotwelded to form the desired unit.

Figure 2:
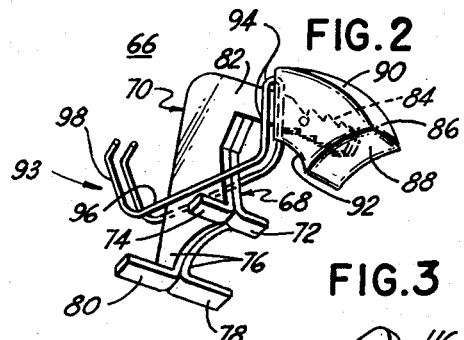
Figure 2 is a perspective view of an ejector assembly according to the present invention, suitable for insertion in the casing of Figure 1.

The ejector assembly includes a suitable ejecting spring, designated generally at 93, to maintain the assembly normally in a retracted or non-ejecting position corresponding to the heavy line position of Figure 4. This spring is conveniently formed as shown in Figure 2, with a looped portion 94 doubled on itself and adapted to fit over the operating arm 82 and engage the inner end of the operating button 86. Angularly disposed with respect to this portion 94 is another pair of spring arms 96, which terminate in bearing portions 98, adapted to engage the upper inner wall portion 100 of the gear casing recess 56.

The spring member 93 is so formed that the two parallel sides of the spring tend to resiliently grip the operating arm portion 82 of the ejecting member to support the spring on the lever in the assembled position of Figure 2 for insertion of the parts as a unit into the gear casing recess 56. When the parts have been inserted to the position of Figure 4, the spring will normally hold the ejector in the retracted position shown but will permit manual operation of the ejector to rotate the parts counterclockwise in that figure against the resilience of the spring. Such rotation will eject the beaters in the manner described, as a result of pressure against the operating button tending to move the button upwardly and inwardly of the casing.

It will be noted that the rear end of the button 86 is angularly oriented so that its upper corner (intersecting surface 90) is closer than its lower corner (intersecting surface 92) to the upper chamber wall 100 which engages the spring. Thus the inclined rear end of button 86 is oriented at an acute angle to the direction of thrust of the spring so that the camming engagement of the rear end against spring loop 94 will urge the spring loop 94 downwardly with the bight of the loop engaging the top of arm 82. Thus the spring loop 94 cannot slip upwardly to disengage the rear of button 86 during operation of the device.

Figure 3:
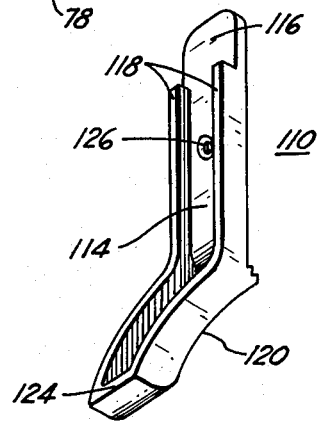
Figure 3 is an enlarged perspective view of a retaining member for holding the ejector assembly of Figure 2 in its operating position within the casing of Figure 1.

In order to accommodate the operating button 86, the front portion of the recess or chamber 56 in gear casing 10 is provided with an enlarged portion 102. At the upper end of this enlarged recess or portion 102, the front of the casing also has a shallow connecting recess 104 which extends upwardly along the front of the casing and provides a seat or supporting surface 106 for the removable retaining and cover member 110. Deeper recessed portions 108 may be located along part or all of the sides of seat 106 to accommodate strengthening ribs 118 on the cover member 110 (Figure 3). These strengthening ribs 118 project inwardly at each edge of the vertical front wall portion 114 of the retaining member. The ribs do not, however, extend all the way to the top of the retaining member. Thus a flat upper portion 116 is provided on the retaining member for engagement with the upper portion of seat 106. The seat itself is provided with a threaded hole 112, while the retaining member has an aligned opening 126, through which a bolt or screw 128 may be passed to maintain the parts in assembled position, as in Figure 4.

It should be noted that the lower end of the removable cover member 110 is curved inwardly at 120 to correspond to the surface curvature of the lower portion of a gear casing 10 and provide a substantially smooth and finished appearance in this region. This inwardly curved lower portion 120 of the retaining member also has an opening or slot 122 through which the operating button 86 is adapted to project. The extreme lower end of the retaining member 110 has a rear surface 124 which is designed to lie flush against the forward surface of shoulders 58 and 60 and effectively close the bearing slots 62 and 64 and retain the pivot or fulcrum portions 72 and 74 in those slots. Thus the casing and cover have cooperating means providing a bearing portion which is automatically opened for free insertion or removal of the lever fulcrum portions when the cover is removed.

In order to conceal the fastening screw 128 of the cover member 110, the outer portion of the gear casing 10 may, if desired, be somewhat recessed, as shown at 130, to permit the mounting of a trim strip 132 around the forward end of the casing. This trim strip 132 is designed to rest on the ledges or shoulders 134 of the casing (as well as a similar ledge portion on the cover and retaining member) so that the outer surface of the trim strip lies flush with the rim 136 of casing 10. Cover 110 includes a mating rim portion which continues the rim 136 across the lower part of the forwardly open chamber 56—102. The trim strip may be secured in any suitable fashion and serves to conceal the lines along which the retaining member 110 meets the recessed front wall 130 of the gear casing.

It will be apparent from the foregoing description that a beater ejecting mechanism has been provided which involves a minimum number of parts and which can be readily assembled and disassembled without difficulty. The ejector unit and its spring may be first assembled as shown in Figure 2. The arrangement of chamber 56 and the communicating vertical passage 54 at its lower end, and the intersection of such passage with the cross slot 52 for the ejecting fingers, make it possible to insert the assembled parts shown in Figure 2 through the open forward end of the chambers 56 and 102 until the fulcrum fingers 72 and 74 engage their forwardly opening bearings. The cover member 110 may then be placed in position and the retaining screw 128 inserted to prevent disassembly.

The resulting construction provides a manual operating button for the ejecting mechanism at a convenient location at the lower front end of the power unit casing. Force may be applied upwardly and inwardly against this operating button 86 to provide the desired beater ejecting movement. Furthermore, the use of an adjacent wall (in this case the front wall portion next to the bottom wall) as the open side through which the parts are inserted makes it possible to provide the necessary space without substantially weakening the bottom casing wall or the bearing portions for the drive spindles. The construction is economical to manufacture and easy to operate.

Since minor variations in the exact shape and arrangement of the parts will be readily apparent to persons skilled in this field, it is intended that the present invention shall not be limited to the specific embodiment shown and described above but shall include such variations, modifications, and alterations as fall within the spirit and scope of the attached claims.

Now, therefore, I claim:

1. Heater ejecting mechanism for a household power unit having a casing defined by outer walls, a drive spindle within the casing and externally accessible at one wall of the casing and retaining means for holding an operated shaft in rotary driving engagement with the spindle at said wall and adapted for disengagement of the shaft by forced relative axial movement of the shaft with respect to the spindle, said ejecting mechanism comprising means in said casing providing a separate ejecting mechanism chamber opening through said one wall adjacent said spindle, a removable cover member for the chamber, an ejecting lever member within the chamber having an ejecting arm projecting through said wall adjacent the spindle and an operating arm projecting outwardly from the chamber and accessible outside the casing, said lever member having a fulcrum portion within the casing, and cooperating means in the casing and on the cover providing a bearing portion pivotally retaining and supporting said fulcrum portion for rotation of the lever between ejecting and non-ejecting positions of said ejecting arm, said bearing portion being automatically opened for free insertion or removal of the lever and its fulcrum portion when said cover is removed.

2. Beater ejecting mechanism according to claim 1 in which the removable cover has an opening, and the operating arm projects outwardly through the cover opening.

3. Beater ejecting mechanism according to claim 1 and including an ejecting spring within the chamber wherein the ejecting spring is doubled on itself to provide two free arms at one end and a bight at the other end, the bight engaging the operating arm of the lever with the spring arms immediately adjacent the bight resiliently gripping opposite sides of said operating arm, and the free arms engaging the inside of the chambers.

4. Beater ejecting mechanism for a household power unit having a casing defined by outer walls, a drive spindle within the casing and externally accessible at one wall of the casing and retaining means for holding an operated shaft in rotary driving engagement with the spindle at said wall and adapted for disengagement of the shaft by forced relative axial movement of the shaft with respect to the spindle, said ejecting mechanism comprising means in said casing providing a separate ejecting mechanism chamber having a passageway extending through said one wall adjacent the spindle and also having an opening outwardly through an adjacent casing wall generally perpendicular to said one wall, a removable cover member for the opening in said adjacent wall, an ejecting lever member within the chamber having an ejecting arm projecting through said passageway adjacent the spindle and an operating arm projecting outwardly through said adjacent wall and accessible outside said wall, said lever member having a fulcrum portion within the casing extending transversely and oppositely outwardly from said lever member, and cooperating means in the casing and on the cover providing a bearing portion transverse of said lever member and pivotally retaining and supporting said fulcrum portion for rotation of the lever between ejecting and non-ejecting positions of said ejecting arm, said bearing portion being automatically opened for free insertion or removal of the lever and its fulcrum portion when said cover is removed.

5. Beater ejecting mechanism according to claim 4 in which the passageway through said one wall and the opening from the chamber through said adjacent wall are connected to provide a single unobstructed slot through the intervening portions of both walls for insertion and removal of the ejecting lever member with the end of its ejecting arm on the outer side of said one wall.

6. Beater ejecting mechanism according to claim 5 in which the ejecting arm has an ejecting finger at its outer end, the ejecting finger having a cross section larger than said passageway and the remainder of the ejecting arm having a cross section adapted to slide freely through the slot and into the passageway on insertion of the ejecting lever through the opening in said adjacent wall.

7. Beater ejecting mechanism for a food mixer having a casing defined by outer walls, a rotatable drive spindle within the casing and accessible at one wall of the casing, and retaining means for holding an operated shaft in rotary driving engagement with the spindle and adapted for disengagement of the shaft by forced relative axial movement of the shaft with respect to the spindle, said ejecting mechanism comprising means in said casing providing a chamber having a passageway extending through said one wall adjacent said spindle, said passageway and chamber also extending outwardly and opening through an adjacent wall of the casing, a bearing portion within the chamber substantially parallel to the width across said opening including a bearing recess having an open side facing out toward said adjacent wall, said recess being high and deep relative to its width across the opening through the wall, an ejector assembly including a lever member having a substantially transverse bearing projection for engagement within said bearing recess on insertion of the assembly through said adjacent wall, said lever member having an ejecting arm movable in said passageway axially of the spindle to disengage the shaft on rotation of the lever, said lever member also having an operating arm projecting outwardly from said chamber and passageway through said adjacent wall, a manually operable externally accessible portion at the outer end of said arm, and a removable cover and retaining member secured with respect to said casing and substantially closing the passageway and chamber, said cover and retaining member having a portion effectively closing at least a portion of said bearing recess and thereby holding the bearing projection therein.

8. Beater ejecting mechanism according to claim 7 in which said removable cover and retaining member has an opening, with said operating arm projecting out through said opening, and in which the ejector assembly includes a spring having one end portion secured to the ejecting lever member for insertion and removal of the spring and lever as a unit, the spring having another portion adapted to engage the inside of said chamber when the parts are assembled and thereby resiliently urge the lever member and its ejecting arm to non-ejecting position.

9. Beater ejecting mechanism according to claim 7 in which the food mixer has two parallel drive spindles and said passageway is parallel to said spindles and substantially midway between them, said one wall having an outwardly open recess extending from the passageway toward each spindle, and the ejecting arm of the lever having ejecting fingers projecting toward each spindle and adapted to lie within said outwardly open recess when the ejecting arm is in its non-ejecting position.

10. Beater ejecting mechanism as set forth in claim 7 wherein the lever member is substantially flat parallel to its direction of motion, and the bearing projection and ejecting arm extend in opposite directions from the lever arm substantially perpendicular thereto.

11. An ejector member for ejecting an operated shaft from a food mixer or the like comprising an elongated body portion having transversely disposed bearing and ejecting projections at one end thereof in substantial parallelism with one another, and an arm on the other end of said body portion extending therefrom at an angle to the elongated body portion.

12. An ejector member as set forth in claim 11 wherein the body portion and arm comprise mirror image sections of sheet material held in face-to-face relation, and the bearing and ejecting projections comprise integral sheet metal tabs bent outwardly away from one another.

References Cited in the file of this patent

UNITED STATES PATENTS

| | | |
|---|---|---|
| 2,048,455 | Knapp | July 21, 1936 |
| 2,293,959 | Wright | Aug. 25, 1942 |
| 2,515,755 | Krause | July 18, 1950 |
| 2,605,085 | Gerry | July 29, 1952 |
| 2,616,732 | Schwaneke | Nov. 4, 1952 |